United States Patent [19]

Michael

[11] 4,420,911
[45] Dec. 20, 1983

[54] WORK PIECE HOLDER ASSEMBLY

[76] Inventor: Jan D. Michael, R.R. 1, Box 64, Solon, Iowa 52333

[21] Appl. No.: 961,990

[22] Filed: Nov. 20, 1978

[51] Int. Cl.³ .............................................. B24B 41/06
[52] U.S. Cl. ................................ 51/216 R; 125/11 A
[58] Field of Search ................ 125/11 A, 11 R, 11 T, 125/11 PH, 11 CC, 11 PT; 51/60, 216 R, 217 R

[56] References Cited
U.S. PATENT DOCUMENTS

| | | | |
|---|---|---|---|
| 1,182,362 | 5/1916 | Fischer | 125/11 A |
| 1,857,142 | 5/1932 | Leeuw | 125/11 T |
| 1,874,156 | 8/1932 | Barish | 125/11 A |
| 2,364,322 | 12/1944 | Shultz | 125/11 A |
| 2,446,833 | 8/1948 | Johnson | 125/11 TP |
| 3,120,723 | 2/1964 | Jessup | 51/60 |

Primary Examiner—Harold D. Whitehead
Attorney, Agent, or Firm—G. Brian Pingel

[57] ABSTRACT

A work piece holder assembly for moving a work piece along a selected annular path relative to a predetermined fixed position of a work tool. The assembly includes a base member having a concavely arcuate shaped guide track, a saddle member slidably mounted on the base member for movement on the guide track, and a work piece mount for attaching the work piece to the saddle member in a predetermined relation with respect to the work tool.

2 Claims, 5 Drawing Figures

U.S. Patent    Dec. 20, 1983    4,420,911
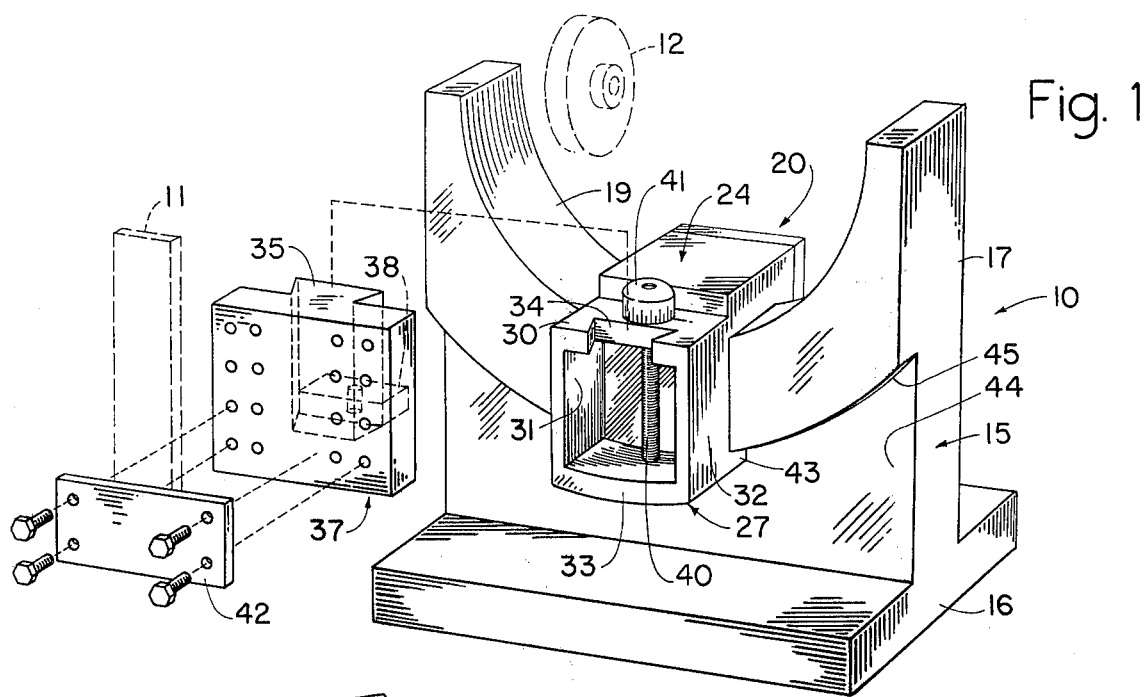
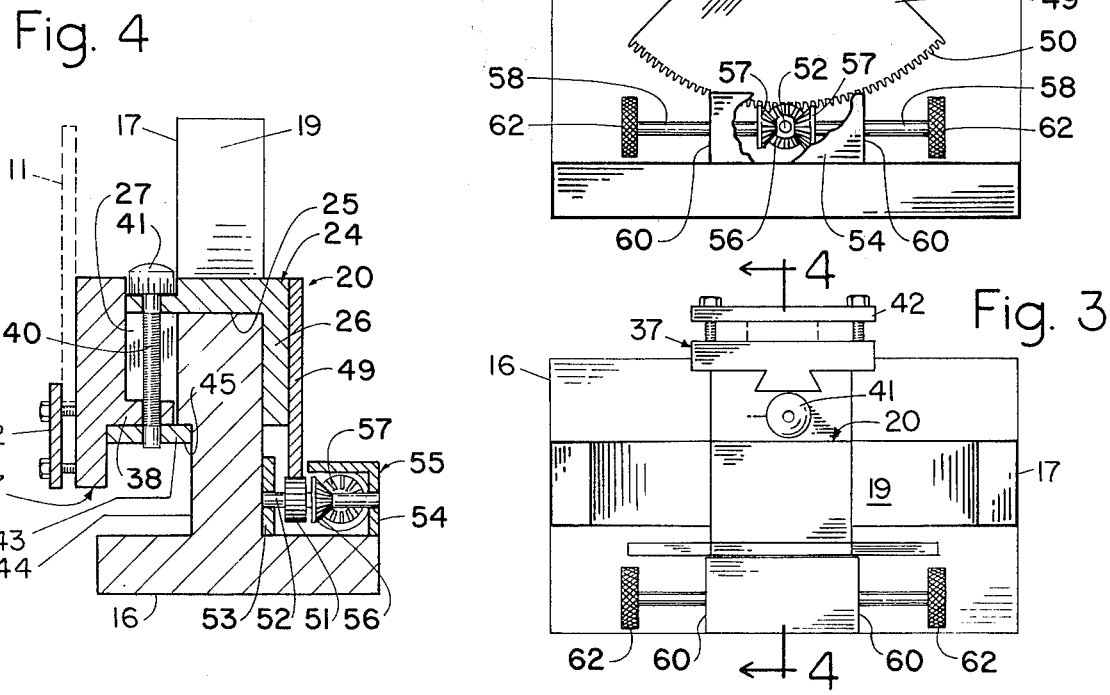

WORK PIECE HOLDER ASSEMBLY

BACKGROUND OF THE INVENTION

1. Field of the Invention

The present invention relates in general to a work piece holder assembly for holding a work piece in a specific relation to a tool such as a grinding wheel, and more specifically relates to a holding assembly that permits annular movement of the work piece with respect to the tool.

2. Description of the Prior Art

Work piece holder assemblies have been developed that permit a work piece to be moved on a plane normal to the cutting surface of a grinder wheel to permit a wide variety of straight and convex surfaces to be cut on the work piece. However, frequently it is desired to cut a concave curved surface on the work piece and standard holding assemblies cannot be used for this purpose.

Prior art devices have previously been proposed for providing curved surfaces on a work piece such as that disclosed in U.S. Pat. No. 3,120,723 issued Feb. 11, 1964, to Jessup. Although the Jessup device appears to provide an accurate means for forming curved surfaces on a work piece, its construction is highly complex and would be unreasonably expensive to manufacture. Accordingly, a need exists for a tool holding assembly that not only provides a means for accurately forming curved surfaces on a work piece, but also provides such an assembly that can be inexpensively manufactured.

SUMMARY OF THE INVENTION

The present invention provides a work piece holder assembly employed for moving a work piece along an annular path in a fixed relation to a work tool to provide a means for forming various degrees of curved surfaces on the work piece. The assembly is of a relatively simple construction and includes a base member having a concavely arcuate shaped guide track means, movable means slidably mounted on the base member for movement on the guide track, and means for adjustably holding the work piece on the movable means in a predetermined relation with respect to the work tool.

The movable means is formed of a saddle member that rides on the guide track and is secured to a gearing arrangement that permits precise saddle member movement control as the saddle member travels along the guide track. With such controlled movement of the saddle member and an attached work piece, the amount of contact of the work tool with the work piece can readily be adjusted to accommodate the hardness of the particular material from which the work piece is formed. Also, various degrees of curved surfaces can be cut on the work piece through adjustment of the position of the work piece with respect to the saddle member, as the greater the distance the outer end of work piece extends above the saddle member to engage the work tool, the greater the degree of surface curvature that results.

BRIEF DESCRIPTION OF THE DRAWINGS

FIG. 1 is an exploded side perspective view of a work piece holder assembly of the present invention together with a work piece and a grinder wheel shown in dashed lines;

FIG. 2 is a side view in elevation of the assembly of FIG. 1 showing the side opposite that shown in FIG. 1 and with a portion cut away to show interior components;

FIG. 3 is a plan view of the assembly of FIG. 2;

FIG. 4 is a cross sectional view taken along line 4—4 of FIG. 3; and

FIG. 5 is a side perspective view of a work piece mount that forms a portion of the assembly of FIG. 1.

DESCRIPTION OF PREFERRED EMBODIMENT

The present invention provides a work piece holder assembly, shown generally at 10 in FIG. 1, that securely holds a work piece 11 for precisely controlled annular movement with respect to a machining tool such as a grinding wheel 12 or the like. Thus, through the use of the holder assembly 10, curved surfaces of a desired curvature can be formed on work pieces without regard to hardness of the material forming the work piece.

The holder assembly 10 includes a guide support member 15 having a rectangularly shaped base portion 16 and an upright guide portion 17 extended along the longitudinal axis of the base portion 16. The upper end of the guide portion 17 is concaved to form an arcuate shaped guide track 19 with a fixed known radius on which a saddle member 20 is slidably disposed for travel from one side of the guide portion 17 to the other side.

The saddle member 20 has an upper portion 24 with a bottom surface 25 (FIG. 4) which is in sliding contact with the guide track 19 of the guide portion 17. Extended downwardly from the upper portion 24 are opposite side portions 26 and 27 that are spaced sufficiently close together so that they slidably engage the side walls of the guide track 19. Thus, the bottom surface 25 and the side portions 26 and 27 define a channel in the saddle member 20 that is tailored to the size of the guide track 19, thereby insuring that the saddle member 20 will ride on the guide portion 17 with substantially no wobbling or swaying movement of the saddle member 20 as it travels along the guide track 19.

As shown in FIG. 1, the side portion 27 is hollow and has a top wall 30, stepped down from the top of the upper portion 24, side walls 31 and 32, respectively, and a bottom wall 33. The upper wall 30 has a dove tail shaped notch 34 in its outer edge for receiving a conforming rib 35 that protrudes from the middle of one side surface of a rectangularly shaped work piece mount 37. At the base of the dove tail rib 35, as shown in FIGS. 1 and 4, a bracket portion 38 also protrudes from the work piece mount 37 to extend beyond the rib 35.

The bracket portion 38 has a threaded vertical bore 39 for receiving a rotatable screw 40, as shown in FIG. 4, that is disposed through the top and bottom walls 30 and 33, respectively. The screw 40 has a calibrated top knob 41 that provides a precise means for vertically adjusting the work piece mount 37 incrementally with respect to the saddle member 20. The work piece 11 can readily be attached to the work piece mount 37 in a vise-type fashion, as best shown in FIG. 3, by a clamp plate 42 that is boltable to the mount 37. Accordingly, adjustment of the mount 37 provides for vertical adjustment of the work piece 11 with respect to the grinder wheel 12.

To contain the saddle member 20 on top of the guide track 19, the bottom of the side portion 27 has an inner flange 43 that extends into a recess 44 in the upright portion 17, which recess is defined at the top by a ledge 45 arcuately shaped identically to the arcuate guide track 19. The inner flange 43 is in firm sliding engagement with the ledge 45 to prevent up and down movement of the saddle member 20 on the guide member 17.

To control movement of the saddle member 20 along the guide track 19, a gear sector 49 is attached in a surface-to-surface relation to the side wall 26 of the saddle member 20. As shown in FIGS. 2 and 4, the bottom edge of the gear sector 49 is lined with teeth 50 for meshing with a gear wheel 51 secured on an axle 52. One end of the axle 52 is journaled in a bushing 53 fixed to the upright guide member 17 while the opposite axle end is journaled in a side wall 54 of a gear cover member 55 secured to the base member 16. A first conical gear 56 is also mounted on the axle 52 and is in meshing engagement with a pair of second conical gears 57 that are fixed on axles 58.

Each of the axles 58 is journaled through an end wall 60 of the gear cover member 55 to lie normal to the axle 52 and each has a knurled knob 62 on its free end. Turning of either of the knurled knobs 62 on the axles 58 thereby drives the axle 52 and the gear wheel 51 thereon, which in turn drives the sector gear 49 and the saddle member 20 secured thereto. Thus, the saddle member 20 is precisely movable from one end of the guide track 19 to the opposite end thereof to move the attached work piece 11 in an arcuate relation into contact with the grinding wheel 12.

Although the saddle member 20 always travels along the same arcuate path on top of the guide track 19, the curvature of the cut made in the work piece 11 by the grinding wheel 12 can be varied through adjustment of the position of the work piece with respect to the saddle member. As indicated by the various positions of the work piece 11 shown in FIG. 2, the closer the work piece end being cut is to the saddle member 20, the closer the curvature of such end will be similar to the curvature of the guide track 19. Conversely, the further away the end being cut is from the saddle member 20, the greater will be the curvature of the cut. Thus, to make a cut of a specific curvature simply requires an initial calculation to determine how high the end being cut must be above the arcuate guide track 19 of known radius for achieving the desired curvature. Next, the work piece is clamped on the work piece mount 37 by means of the clamp plate 42.

As shown in FIG. 1, the mount 37 has a plurality of threaded bores so that the clamping plate 42 can be attached thereto in a wide variety of positions in order to permit mounting of the work piece 11 on the saddle member 20 at approximately the desired position. The work piece mount 37 can then be vertically adjusted by turning the screw 40 to eliminate minor deviations from the desired position. With the saddle member 20 moved to one side of the guide track 19, the grinder wheel 12 is moved into a proper position for engaging the work piece end during movement of the saddle member 20 along the guide track 19. Of course, in handling work pieces formed from hard metals, any cuts therein must be made incrementally and that is why it is important that movement of the saddle member along the guide track 19 is precisely controlled by means of the sector gear 49.

Thus, the present invention provides a relatively simple assembly for moving a work piece along a selected annular path relative to a predetermined fixed position of a work tool to enable the ready cutting of curved surfaces on the work piece at desired curvatures.

Although the invention has been described with respect to a preferred embodiment thereof, it is to be understood that it is not to be so limited since changes and modifications can be made therein which are within the full intended scope of this invention as defined by the appended claims.

I claim:

1. A work piece holder assembly for moving a work piece along a selected annular path relative to a predetermined fixed position of a work tool, said assembly comprising:
    (a) a base member that is stationary with respect to said work tool and has an arcuate shaped guide track means with an upper portion and a pair of side walls;
    (b) a saddle member having a top portion ridable on the upper portion of said guide track means, and spaced side portions slidably engageable with said sidewalls of said track means to hold said saddle member against lateral movement;
    (c) means for adjustably attaching the work piece to said saddle member in a predetermined relation with respect to said work tool and including:
        1. a work piece mount slidably disposed on one side portion of said saddle member for vertical movement with respect thereto; and
        2. a clamping member attachable to said work piece mount to releasably secure the work piece to said mount;
    (d) means for precisely controlling the movement of said saddle member with respect to said work tool, said means including:
        1. a gear sector associated with one of said sidewalls of said saddle member and engageable with said movement control means; and
        2. gear means mounted on said base member and in meshing engagement with said gear sector.

2. A work piece holder assembly according to claim 1 wherein said gear sector is concentrically related to the arcuate track of said base member.

* * * * *